(12) United States Patent
Mangelsen et al.

(10) Patent No.: US 8,146,901 B2
(45) Date of Patent: Apr. 3, 2012

(54) MODULAR ROBOTIC WORKPIECE HOLDER AND METHOD FOR USING SAME

(75) Inventors: Jan Christian Mangelsen, Charlotte, IA (US); Mike Stoecker, Eldridge, IA (US); Terry O'Connell, Davenport, IA (US); Terry Daggett, Blue Grass, IA (US); Mike Skahill, Pleasant Valley, IA (US); Dean Anderson, Carlisle, IA (US)

(73) Assignee: Genesis Systems Group, LLC, Davenport, IA (US)

( * ) Notice: Subject to any disclaimer, the term of this patent is extended or adjusted under 35 U.S.C. 154(b) by 1242 days.

(21) Appl. No.: 11/466,015

(22) Filed: Aug. 21, 2006

(65) Prior Publication Data

US 2008/0046120 A1 Feb. 21, 2008

Related U.S. Application Data

(60) Provisional application No. 60/822,467, filed on Aug. 15, 2006.

(51) Int. Cl.
B25B 1/20 (2006.01)
(52) U.S. Cl. ............................................. 269/43; 269/71
(58) Field of Classification Search .................. 269/139, 269/56, 57, 71, 43, 138, 16
See application file for complete search history.

(56) References Cited

U.S. PATENT DOCUMENTS

| 1,481,503 | A | * | 1/1924 | Carswell et al. ................ 269/61 |
|---|---|---|---|---|
| 1,812,585 | A | * | 6/1931 | Collins ............................ 269/59 |
| 2,568,233 | A | * | 9/1951 | Hamilton ......................... 269/43 |
| 3,977,662 | A | * | 8/1976 | Cook ................................ 269/60 |
| 4,095,778 | A | * | 6/1978 | Wing ................................ 269/71 |
| 4,641,820 | A | * | 2/1987 | Gold et al. ....................... 269/58 |
| 4,666,363 | A | * | 5/1987 | Johansson ...................... 414/736 |
| 5,074,741 | A | * | 12/1991 | Johansson ...................... 414/736 |
| 5,083,070 | A | * | 1/1992 | Poupard et al. ............. 318/568.1 |
| 5,704,601 | A | * | 1/1998 | Mangelsen et al. ............. 269/57 |
| 5,851,007 | A | * | 12/1998 | Swartzlander et al. ......... 269/17 |
| 5,873,569 | A | * | 2/1999 | Boyd et al. ...................... 269/43 |
| 5,921,459 | A | * | 7/1999 | Heraly et al. ................... 228/45 |
| 6,264,418 | B1 | * | 7/2001 | Michael et al. ............... 414/733 |
| 6,281,474 | B1 | * | 8/2001 | Michael et al. ............... 219/158 |
| 6,347,733 | B1 | * | 2/2002 | Hickey, II .................... 228/49.1 |
| 6,375,178 | B1 | * | 4/2002 | Schilb et al. .................... 269/71 |
| 6,450,490 | B1 | * | 9/2002 | Mangelsen et al. ............. 269/43 |
| 6,859,989 | B2 | * | 3/2005 | Bauer et al. ..................... 29/559 |
| 6,865,802 | B2 | * | 3/2005 | Lenzen et al. .................. 29/783 |
| 6,921,011 | B1 | * | 7/2005 | Mangelsen et al. .......... 228/44.3 |
| 7,172,376 | B1 | * | 2/2007 | Jagtap et al. .................. 409/225 |

(Continued)

FOREIGN PATENT DOCUMENTS

EP 1676677 A1 * 7/2006

*Primary Examiner* — Lee D Wilson
*Assistant Examiner* — Jamal Daniel
(74) *Attorney, Agent, or Firm* — McKee, Voorhees & Sease, P.L.C.

(57) ABSTRACT

The invention relates to a modular positioning robotic system and method of use of the positioning system. In general, the modular positioning robotic system is comprised of a controller module, a positioning module and a base that can be either a stationary base or drive module. The positioning module also allows for additional flexibility by allowing for designs with multiple allowable adjustments that can be changed for a change in turn diameter, length, width and weight of a fixture and part combination.

13 Claims, 8 Drawing Sheets

U.S. PATENT DOCUMENTS

| | | | |
|---|---|---|---|
| 7,237,758 B2 * | 7/2007 | Nikolic | 248/676 |
| 7,448,606 B1 * | 11/2008 | Johnson | 269/17 |
| 2003/0094742 A1 * | 5/2003 | Eicher | 269/55 |
| 2004/0056405 A1 * | 3/2004 | Ghuman et al. | 269/309 |
| 2005/0035517 A1 * | 2/2005 | Lawrence et al. | 269/139 |
| 2005/0212191 A1 * | 9/2005 | McKelvie et al. | 269/17 |
| 2005/0218577 A1 * | 10/2005 | Kent | 269/139 |
| 2007/0029715 A1 * | 2/2007 | Liu | 269/139 |
| 2007/0108683 A1 * | 5/2007 | Lawrence et al. | 269/139 |
| 2008/0046120 A1 * | 2/2008 | Mangelsen et al. | 700/245 |
| 2008/0150244 A1 * | 6/2008 | Carlei | 280/35 |
| 2008/0258369 A1 * | 10/2008 | Kent | 269/146 |

* cited by examiner

MODULAR ROBOTIC WORKPIECE HOLDER AND METHOD FOR USING SAME

RELATED APPLICATIONS

This application claims priority to U.S. Provisional Patent Application No. 60/822,467 filed Aug. 15, 2006, herein incorporated by reference in its entirety.

BACKGROUND OF THE INVENTION

I. Field of the Invention

The present invention relates generally to the part fixture presentation as used in robotic systems and work cells and specifically to a modular design of the positioning robotic system that allows changes from one type of positioning module to another positioning module that can be selected from a variety of modules and can be used in conjunction with a stationary base or a drive unit that adapts without having to switch the control architecture. A positioning robotic system is originally assembled with a specific positioning device, drive and control module. When the use of the system needs to be changed to accommodate a change in weld locations of a new product because of a change in the diameter, length, width or weight of the fixture and part combination, the positioning device system can be changed to a different system configuration without having to necessarily change the entire system. Instead, only individual components need be changed.

II. Problems in the Art

Many manufacturing processes have become automated. Typically, robots consist of a single mechanical arm that has a limited number of axis about which the arm can move or rotate. The robot arm has a tool, such as a welder, attached to the end of the arm. To provide better robot access to a part fixture combination, modern assembly lines also provide work tables, or positioning modules that hold fixtures and parts, that can be moved to position a product being worked on by the robotic arm within the reach of the arm.

There are a great variety of positioning modules that can position material within the reach of a robot. One such module is a turntable. A turntable is essentially a flat round surface that rotates about an axis. The turntable typically enables the robotic arm to work on parts on one portion of the circular surface while the other portion of the table is loaded and unloaded. The table is rotated about an exchange axis to more safely separate the operator from the robotic arms' movements. The turntable is ideal for situations in which the parts do not need to be repositioned while being processed.

Another positioning module design is the H-frame. The H-frame module rotates about an axis also, but instead of having a flat surface to mount fixtures and parts to, it has two sets of arms that products are mounted between. The addition of arms allows for the system to have two axis of rotation to better provide for the robot to work.

Another style of positioning module is termed a Ferris wheel frame. A Ferris wheel frame is essentially a rectangular shaped flat surface that pivots around an axis that extends along the length of the surface. Arms are mounted perpendicular to the planar surface of the Ferris wheel. Much like the H-frame, products or fixtures (devices used to hold smaller sized products) are suspended between the arms.

Modern assembly lines, work cells and factories typically consist of a mixture of work stations that require different types of positioning devices because of the unique processing needs of the part. Today's work station is set up and built around tool turning diameters and length, and are designed to function in a specific way. If the part being produced requires a change in the part fixture, then the entire work station and positioning module may need to be replaced or reconfigured.

When a manufacturing plant, assembly line or work cell is retooled to manufacture a new product there is a significant period of down time where the facility does not produce any product. Because of the complexity of the tools, changeover in a highly automated process can take even longer than more traditional assembly plants. Most often, robotic automation fixtures and part combinations come with fixed components that are only common to their tool fixture and part combination.

Several problems arise from this standardization by tool fixture and part combination. Because each tool fixture and part combination is unique and has unique components, a change in tool fixture and part combination can result in the need to buy new capital equipment because the existing station cannot be adjusted for positioning the new tool fixture or part combination because length or diameter changes. The change in systems often causes the utilities to need to be rerouted, which then cause additional down time. The more change overtime, the more money is lost. Additionally, having to replace an entire system is much more expensive than replacing a single component of a system.

It is therefore a primary objective of the present invention to provide a design for a modular system comprised of components that can easily be interchanged and adjusted.

A further feature of the present invention is to provide a modular positioning robotic system that has a control architecture which can be adjusted and used for any selected positioning module/system type utilized in a standard robotic system family.

A further feature of the present invention is to provide a modular system that is easily networked.

Yet another feature of the present invention is to provide a control module that interfaces with a robot controller wherein the robotic controller performs the logical functions.

A still further feature of the present invention is to provide a controller module that interfaces with and controls a drive module.

Another feature of the present invention is to provide a modular positioning robotic system that utilizes an adjustable H-frame positioning module that can add and/or delete an exchange axis drive module or turntable.

Yet another feature of the present invention is to provide a modular positioning robotic system that utilizes a turntable positioning module that can be interchanged with an adjustable H-frame.

Yet another feature of the present invention is to provide a modular positioning robotic system that utilizes an adjustable tool length and width Ferris wheel positioning module.

Yet another feature of the present invention is that the H-frame, turntable and Ferris wheel positioning modules are interchangeable.

A still further feature of the present invention is that the modular positioning system integrates with one or more robots.

A modular positioning robotic system and a method of accomplishing these and other features will become apparent from the following description of the invention.

BRIEF SUMMARY OF THE INVENTION

The present invention uses a controller module, and a positioning module in a positioning robotic system. Additionally, an exchange axis drive module can be utilized in the positioning robotic system.

Preferably, a typical workstation of the present invention uses a control module with a control architect that interfaces with a robot controller to effectively manipulate a drive module and a positioning module to effectively position products to be manufactured. The drive system is designed to provide at least 180° of exchange axis motion. The control module controls the major axis of rotation while the robot controller controls the minor axis of rotation. The major axis of rotation is driven by the drive module. The minor axis of rotation is defined by the attachments that facilitate manipulative fixture and part combination placement. A work piece is rotated about and positioned relative to either side of a robotic arm.

Positioning modules can be of varied by adjusting tool part diameter, tool length, tool width, and the number of operations that must be performed. Additionally, a positioning module can be adjustable to provide the most flexibility to the manufacturing site.

One method of practicing the present invention includes assembling the drive, positioning and control modules into a workstation. A generic controller module is assembled with a controller architecture that is adapted to communicate with multiple types of positioning modules and drive modules without having to be extensively modified. Both network connection and input/output ports are provided to facilitate connection to a myriad of devices. The controller module is attached to the drive unit and the positioning module is received by the drive unit.

When the positioning module needs to be changed to facilitate a different product, the old positioning module is disconnected from the control module. If an exchange axis is needed, the positioning model is attached to a drive module. If the only change necessary is adjustment of the tool length or tool diameter, the old drive unit is reused and only the spacer modules are changed to facilitate repositioning of the safety barrier system. The positioning module is attached to the drive module and connected to the control module without having to also change the control and drive modules when applicable. A new program is either selected on the control module or programmed into it to account for the change in the positioning module.

DETAILED DESCRIPTION OF THE PREFERRED EMBODIMENT

Figure 1:
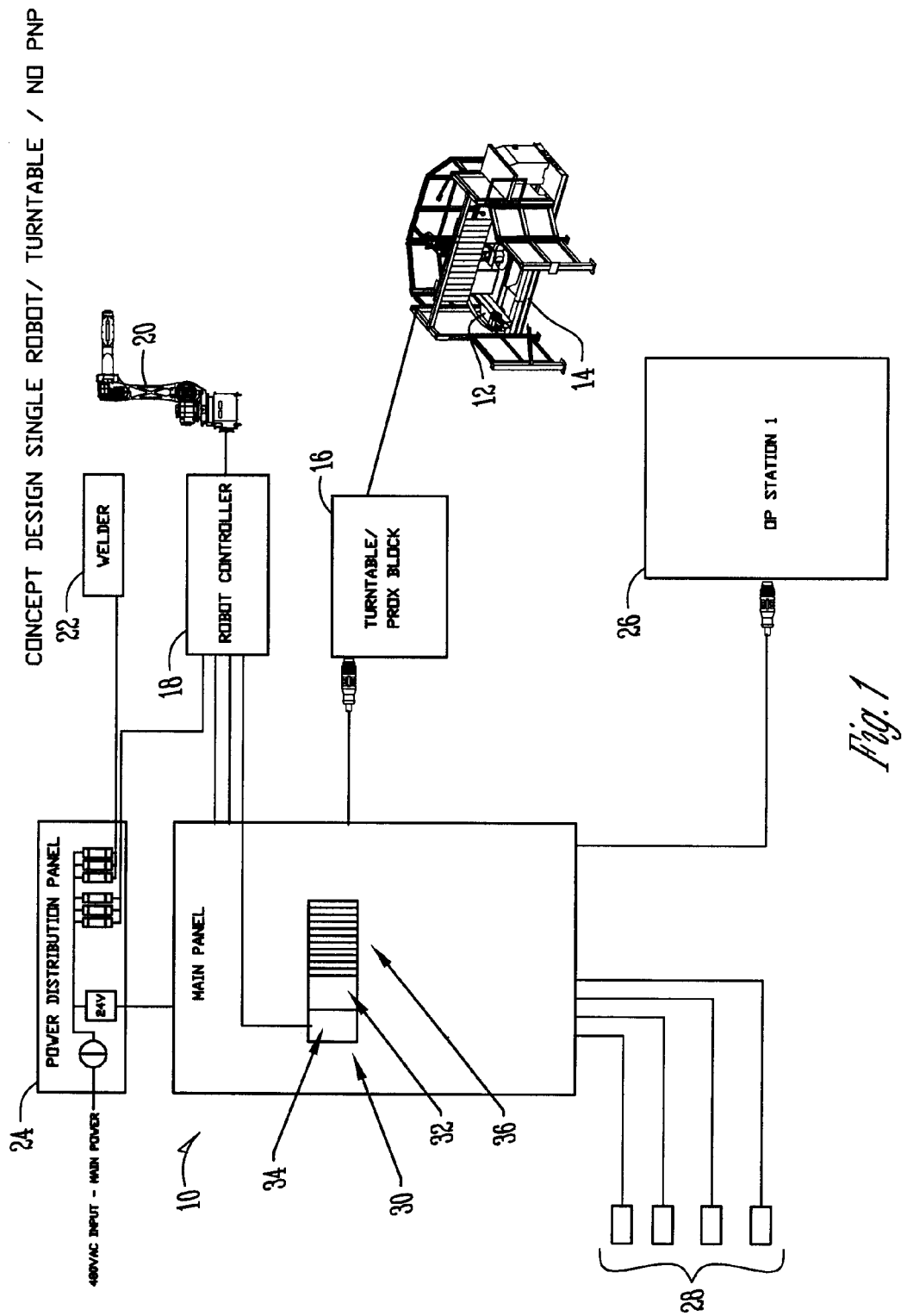
FIG. 1 is a schematic view of an embodiment of the control module and control architecture.

The present invention will be described as it applies to its preferred embodiment. It is not intended that the present invention be limited to the described embodiment. It is intended that the invention cover all modifications and alternatives, which may be included within the spirit and scope of the invention.

Referring to the drawings, numeral 10 generally refers to a control module. Numeral 12 refers to the positioning module generally and numeral 14 refers to the drive module.

The control module 10, as seen in FIG. 1, has input/output port 16 that connect to the drive module 14 and positioning module 12. The control module 10 also interfaces with the robotic controller 18. The robotic controller 18 can be connected to the controller via a hardware connection or via other means.

The robotic controller 18 connects to a robot 20. In the specific example disclosed by FIG. 1, a robot 20 is connected to a welder 22. Other attachments for the robot 20 are contemplated. These attachments could include manipulators, sprayers, etc.

The control panel 10 connects to the power distribution panel 24. Additionally, the control panel 10 connects to the operation station 26. A connection to the operation station has both inputs and outputs that facilitate communication between the control panel 10 and the operation station 26. The operation station 26 can include inputs for cycle start, positioning and adjustment of the positioning module, error fault reset, etc. The operation station could also include outputs such as a display or indicator lights that would indicate the device status.

In addition to communicating with the operation station 26, the control module can also have direct input from remote sensors 28. The sensors 28 could include light curtains, gates, reamers or wire snips. These sensors 28 would be external to the sensors integrated into the robot 20, positioning module 12 or drive module 14.

The control module 10 communicates with the external devices via the control architecture 30. The control architecture 30 is comprised of a programmable logic controller (PLC) 32, communication bus 34 and a separate input/output board 36. The PLC 32 is essentially a small computer utilizing a microprocessor. The PLC manages and controls the stored information to effectively utilize input and output signals. Further, the PLC 32 coordinates the multiple modules by measuring the position of the drive module and positioning module. Further, the control module interacts with the robot controller that controls the minor axis of rotation. A personal computer would be sufficient to store and operate the modules.

The control architecture 30 also contains a communication bus 34. The bus 34 facilitates communication between the external modules and the PLC 30. There are many standards of communication that could be utilized, but the present embodiment prefers to use Ethernet communication or industrial protocol communication to form an open device level network. It is contemplated that the bus 34 could be a traditional ribbon cable as well as a wireless communication system. Additionally, traditional cabling could be utilized to effect communication between the varied modules and input devices.

The PLC 30 also connects to a block of input/output points 36. The input and output block 34 connect external input devices to the PLC 34. In addition, simple logic can also be integrated into the I/O block 36. An example of a more intelligent I/O block would be a SLICE I/O point system where signals along the block can be converted to logic that could be manipulated and sent across Ethernet connections to the PLC 30.

Figure 2:
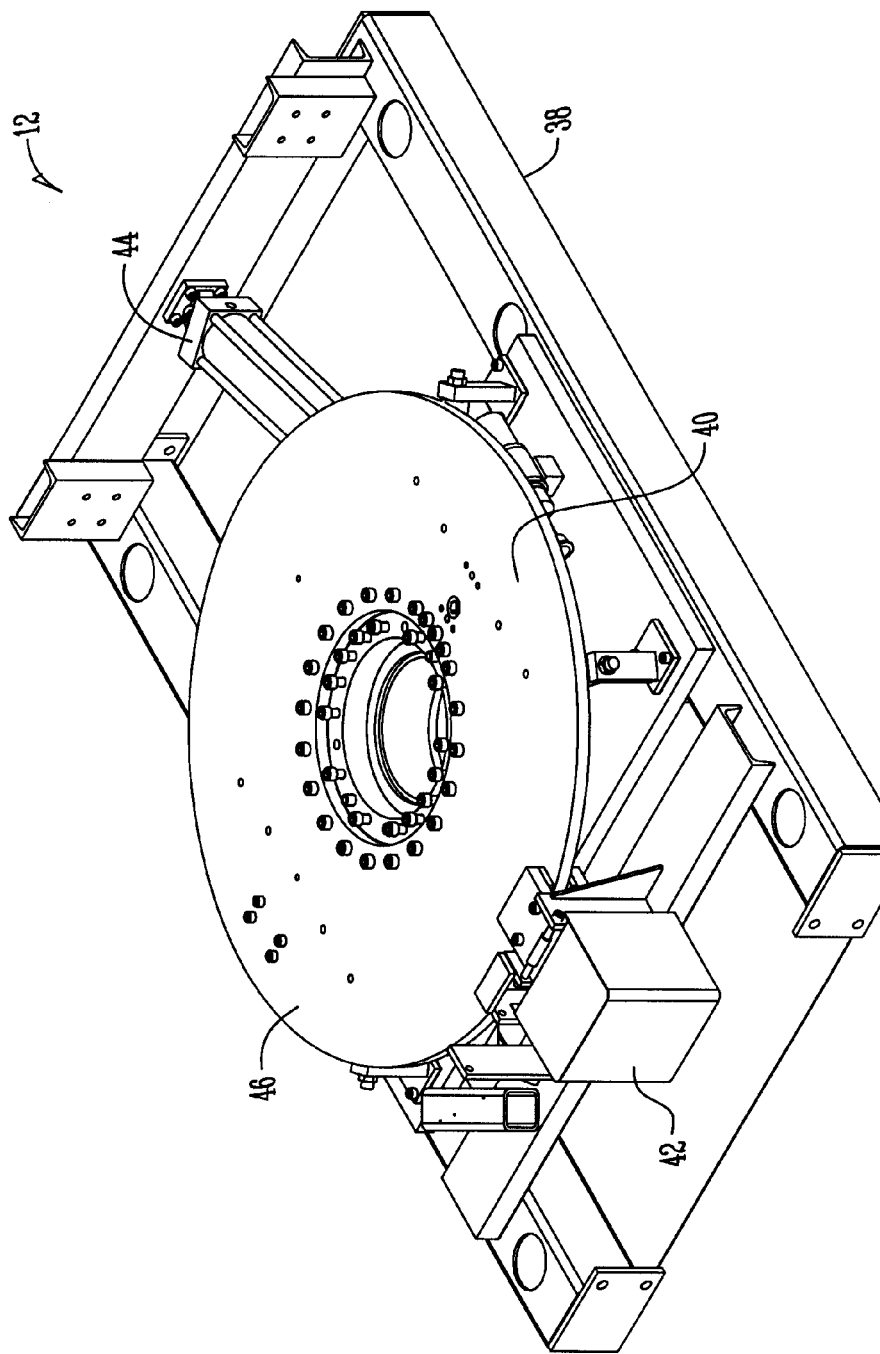
FIG. 2 is a perspective view of an embodiment of the drive module.

FIG. 2 discloses a drive unit 14. The drive unit 14 is generally comprised of a frame 38, a clevis plate 40 and brake assembly 42. The drive module also includes an assembly 44 for rotating the clevis plate 40 through at least 180° of rotation. The clevis plate 40 is fashioned to have multiple attachment points 46 that facilitate mounting the positioning module 12 on the drive module 14.

Figure 3:
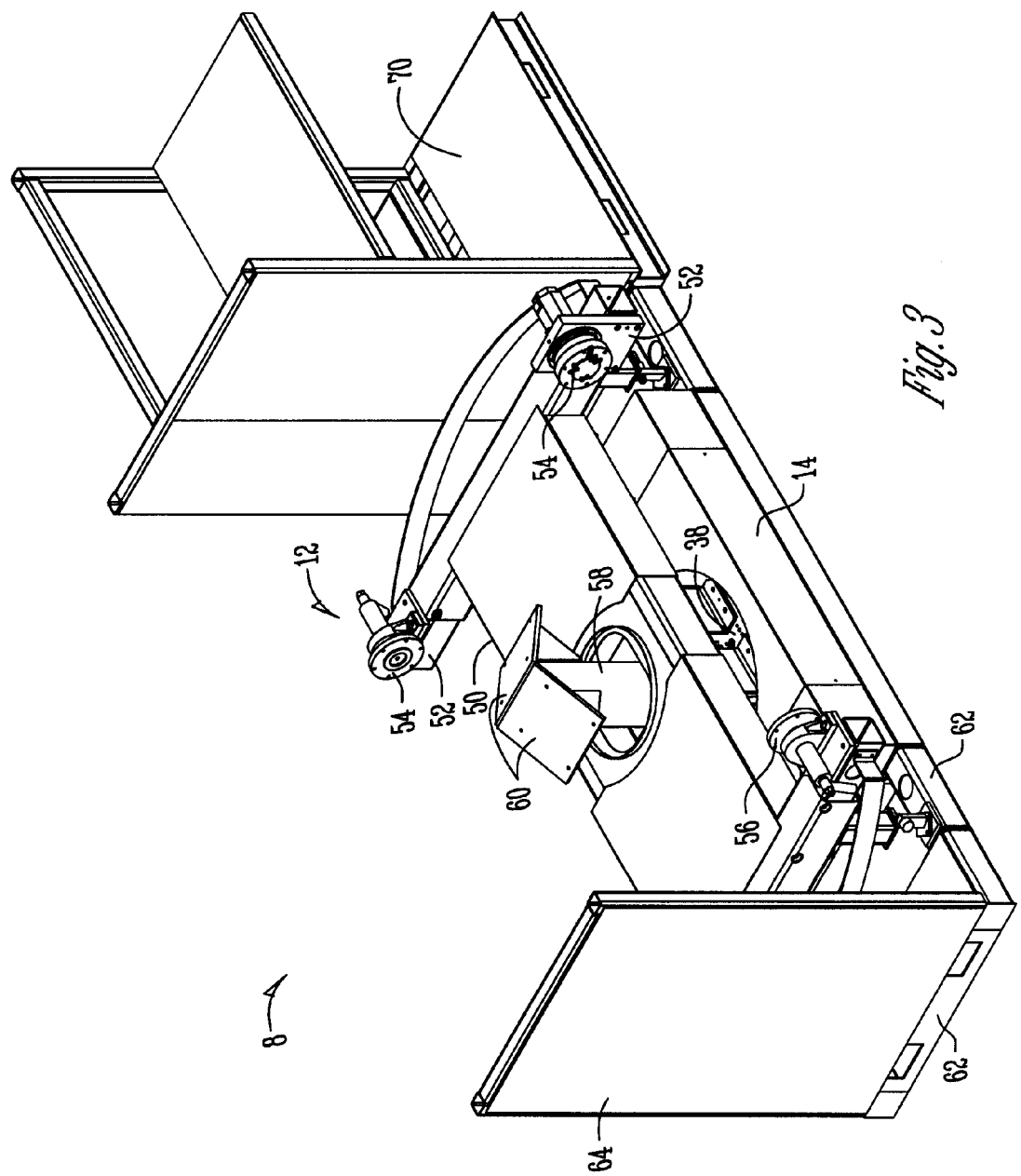
FIG. 3 is a perspective view of a modular positioning robotic system utilizing an H-frame.

FIG. 3 discloses the drive module 16 attached to a control pallet 70. The control pallet 70 is a mechanical structure used to mount the control module 10, controller 18, welder process equipment, valve packages and electrical enclosures. The control pallet is preferably designed to conform with the modular concept as shown such that a single control pallet 70 design is utilized across the multiple tool types.

FIG. 3 also discloses the positioning module 12 mounted to the drive module 14. FIG. 3 specifically discloses an H-frame 50 positioning module. The H-frame design 50 is shaped like an "H" with each open end 52 of the "H" used to mount head 54 and tailstock 56 positioning mechanisms. The head and tailstocks 54, 56 are used to rotate fixtures to position the products such that the robot 20 has access to the products. The dimensions of the H-frame 50 can be fixed such that an H-frame's length and width are permanently fixed after assembly. Additionally the H-frame 50 can be adjustable. The length, width, and rotation diameter of the H-frame 50 can each be independently adjusted after assembly.

Figure 7:
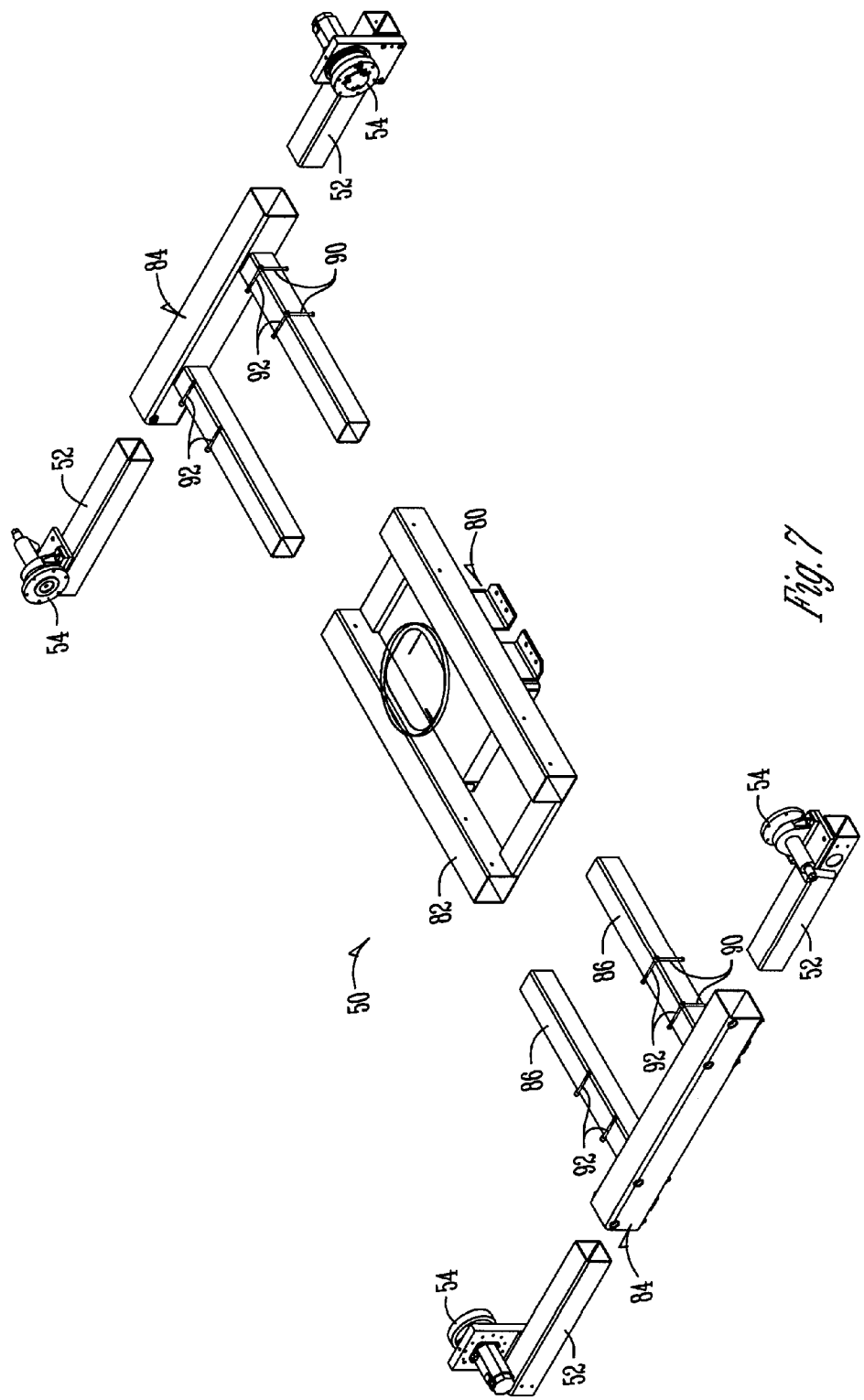
FIG. 7 is a sectional view of the adjustability of the H-frame positioning module.

FIG. 7 shows how the H-frame can be adjusted to change responsive to a change in the fixture and part combination. The main base 80 of the H-frame is designed to attach to either a drive module 14 or a stationary base 76. The main parallel frame 82 is mounted to the main base 80 of the H-frame.

The first 86 and second 88 legs of the T-member 84 of the H-frame are inserted into the parallel frame 82. The arms 52 are inserted into the T-member 84 to form the H-frame 50. The head and tailstock positioning members 54 are attached to the ends of the arms 52.

The H-frame is generally constructed of square metal tubular members. The frame of the H-frame could also be constructed of other geometrical tubular members, such as circular or octagonal. Additionally, the members could also be constructed of combinations of tubular and solid material. The frame does not necessarily need to be constructed of metal. Dependent upon the requirements of the fixture and part combination, i.e., weight, length, width and turning diameter, the H-frame could be constructed of plastics, ceramics, wood, etc.

Figure 8:
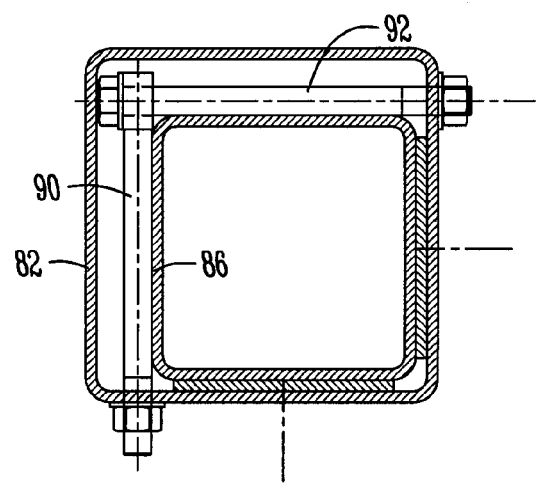
FIGS. 8 and 9 are sectional views of the H-frame clamping system.
Figure 9:
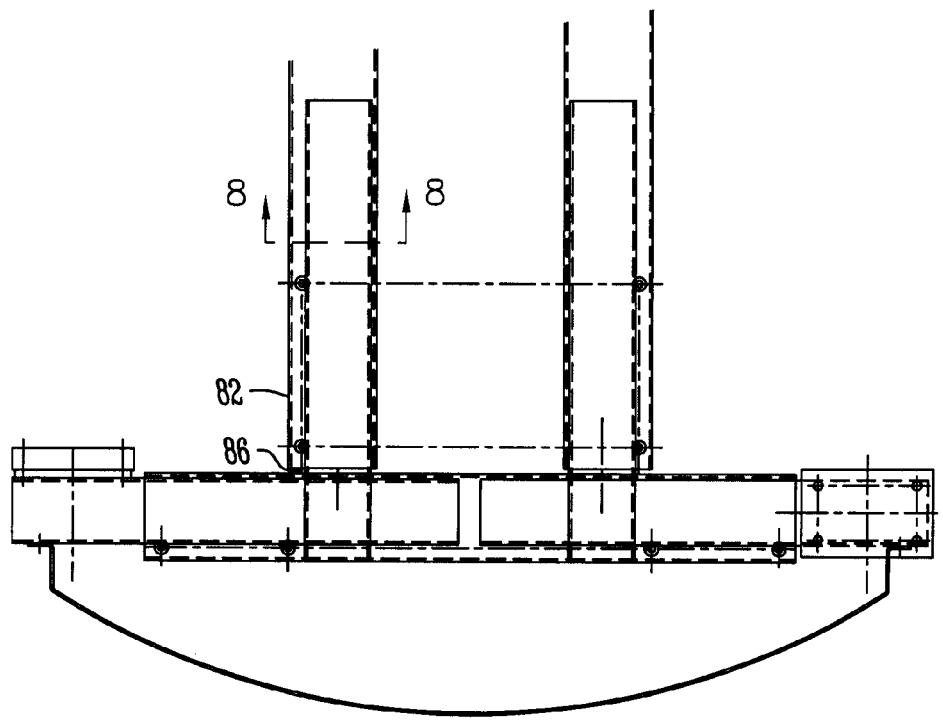

The mechanism for clamping the different components together is simple and repeatable. FIGS. 8 and 9 show the clamp comprising an I-bolt 90 and a standard bolt 92. The standard bolt 92 passes through the I-bolt 90 that is passed through hole 94 along the walls of the tube. The two bolts are 90 degrees from each other, and as a result, the clamping system utilizes a coordinate system that allows for clamping in the x and y directions. The z position, or length of the combined member, can be adjusted by loosening and tightening the clamping bolts. The position can become fixed by drilling additional holes through the frame once the correct position has been determined for a fixture and part combination.

FIG. 3 further discloses a robot riser 58. The robot riser 58 is attached to the frame 38 of the drive module 14. The riser 58 does not rotate, and instead is fixed positionally. The riser 58 rises through the center of the H-frame 50. FIG. 3 depicts the riser 58 as having two mounting surfaces 60. The riser 58 could have any number of surfaces 60 to facilitate mounting the correct number of robots 20.

FIG. 3 also depicts a spacer module 62. Spacer module 62 provides mechanical structure support to join, align, and support the drive module 14, the control pallet 70 and screen 64. The spacer modules help to adjust and control the footprint of the modular positioning robotic system 8. Additionally, the spacer 62 enables screen 64 to be built to shield personnel from the movement of the system as well as blocking any light generated by the welder 22.

Figure 6:
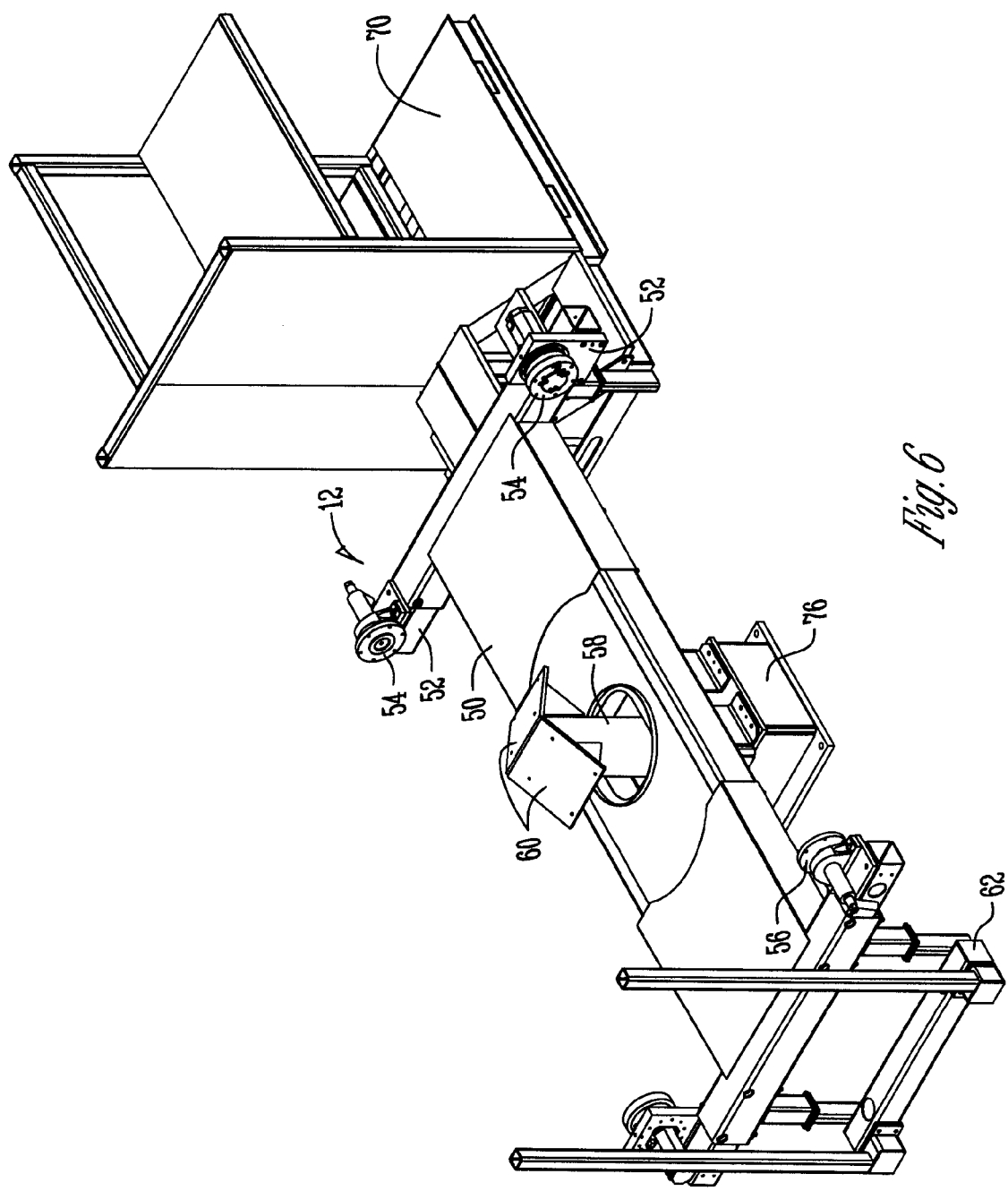
FIG. 6 is a perspective view of a modular positioning robotic system utilizing an H-frame without a drive unit.

FIG. 6 discloses a similar work cell as depicted in FIG. 3. In FIG. 6, the drive unit 14 is replaced with a stationary mounting base 76. This system is utilized when the operator loads the two open ended arms 52 by traveling back and forth between the two sets. In a stationary model, there is no major exchange axis as the frame does not rotate.

Figure 4:
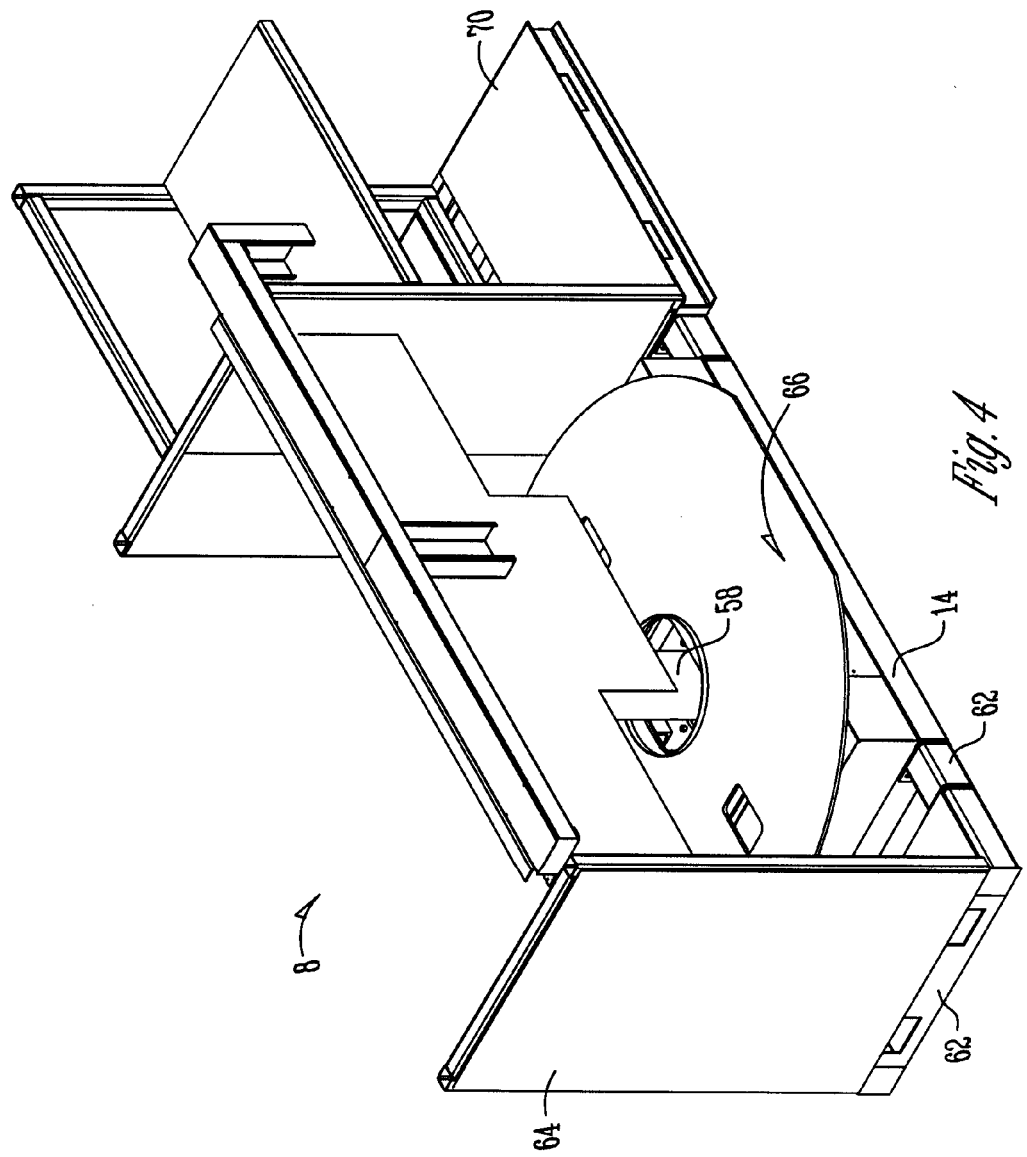
FIG. 4 is a perspective view of a modular positioning robotic system utilizing a turntable.

FIG. 4 discloses the modular positioning robotic system 8 having a positioning module 14 utilizing a turntable 66. The turntable 66 mounts to the clevis top plate 40. The diameter of the turntable is typically fixed. When a different diameter table is needed, a different turntable 66 can be mounted to the drive module 14. The change in diameter of the turntable 66 may require a change of the spacer module 62 to properly position the drive module 14 relative to the control pallet 70 and safety shield 64.

Figure 5:
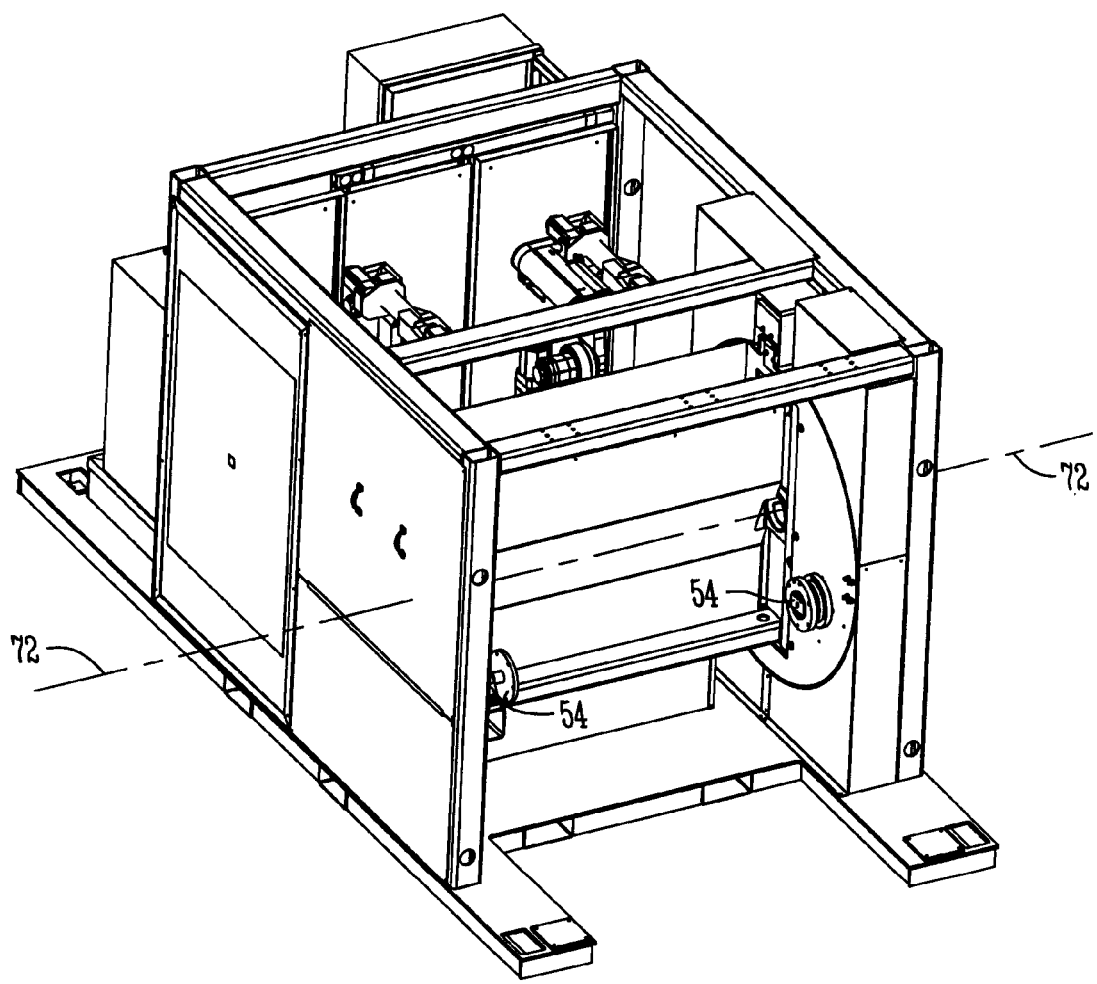
FIG. 5 is a perspective view of a modular positioning robotic system utilizing a Farris wheel in the horizontal position.

FIG. 5 discloses another version of the modular positioning robotic system 8 having a position module 12 that utilizes a Ferris wheel frame 68. Similar to the H-frame 50, the Ferris wheel frame 68 can be a fixed dimension or adjustable. The Ferris wheel frame's 68 length, width and rotational diameter can be each independently adjusted if the Ferris wheel frame 68 is adjustable.

As seen in FIG. 5, the Ferris wheel frame mounts to an upright drive module 14. The Ferris wheel frame rotates about an axis 72. The Ferris wheel frame has arms 74, that head and tailstock 54, 56 connectors that attach to fixtures (not shown) that hold parts to be manipulated by the robotic arm 20 (not shown in FIG. 5).

The preferred embodiment is specifically designed with a control module 10 and drive module 14 that can have either an H-frame positioning module 54 or a turntable module 66 as the third module. The two styles of positioning modules are designed to be easily interchangeable. Additionally it is contemplated that the Ferris wheel style positioner 68 could easily be modified to swap into an existing system.

A general description of the present invention as well as the preferred embodiment and alternative embodiments of the present invention have been set forth above. Those skilled in the art to which the present invention pertains will recognize and be able to practice additional variations in the methods and systems described which fall within the teachings of this invention.

What is claimed is:

1. An adjustable H-frame positioning module comprising:
a base;
a workpiece holder operatively connected to the base and having a first end and a second end with at least one cross-member extending therebetween along a longitudinal axis;
a first set of workpiece supports located on the holder, the first set comprising a first rotatable support located at the first end and a second rotatable support located at the second end and being capable of supporting a first workpiece therebetween for rotation about a first secondary axis between the first and second rotatable supports spaced apart from the longitudinal axis;
a second set of workpiece supports located on the holder, the second set comprising a third rotatable support located at the first end and a fourth rotatable support located at the second end and being capable of supporting a second workpiece therebetween for rotation about a second secondary axis between the third and fourth rotatable supports;

a robot riser attached to the base and extending upwardly through the workpiece holder between the first and second secondary axes;

wherein the workpiece holder being adjustable along the longitudinal axis for accommodating workpieces, of different sizes.

2. The positioning module of claim 1 wherein the cross-member is telescopically adjustable along the longitudinal axis.

3. The positioning module of claim 2 wherein the cross-member comprises a plurality of parts.

4. The positioning module of claim 1 further comprising a drive unit for rotating the workpiece holder about the base.

5. The positioning module of claim 4, wherein the drive module also rotates the workpiece holder about the robot riser.

6. The positioning module of claim 1, wherein each secondary axis is generally parallel to the longitudinal axis.

7. The positioning module of claim 1, wherein each secondary axis is generally parallel to the longitudinal axis, and wherein the robot riser is located between the first and second ends and between the secondary axes.

8. The positioning module of claim 7, wherein the robot riser extends through the longitudinal axis of the workpiece holder.

9. The positioning module of claim 1, wherein the robot riser includes a plurality of robot mounting surfaces.

10. The positioning module of claim 1, wherein each set of workpiece supports is capable of supporting a separate workpiece.

11. The positioning module of claim 1, wherein the robot riser extends through an opening in the cross-member.

12. The positioning module of claim 1, wherein the robot riser is stationary.

13. The positioning module of claim 1, further comprising a drive unit mounted on the base having a plate with a central opening, wherein the plate is rotatable about a central generally vertical exchange axis, wherein the robot riser extends upwardly through the central opening in the plate, and wherein the workpiece holder is mounted on the plate for rotation with the plate about the generally vertical exchange axis.

* * * * *